Dec. 28, 1965  S. ROSIN ETAL  3,226,539
BUBBLE CHAMBER ILLUMINATION MEANS
Filed July 31, 1963  5 Sheets-Sheet 1

INVENTORS
SEYMOUR ROSIN
ROBERT B. PALMER
BY

Dec. 28, 1965     S. ROSIN ETAL     3,226,539
BUBBLE CHAMBER ILLUMINATION MEANS
Filed July 31, 1963     5 Sheets-Sheet 2

INVENTORS
SEYMOUR ROSIN
ROBERT B. PALMER
BY

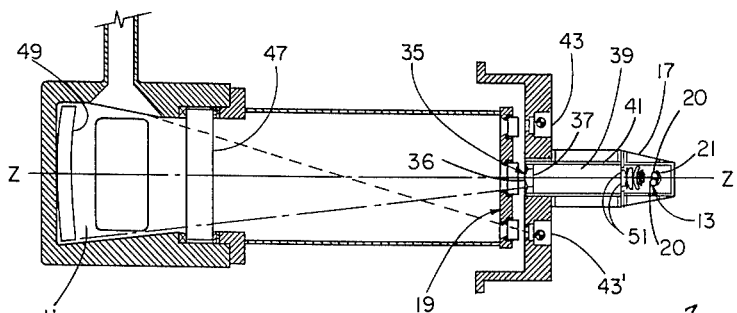
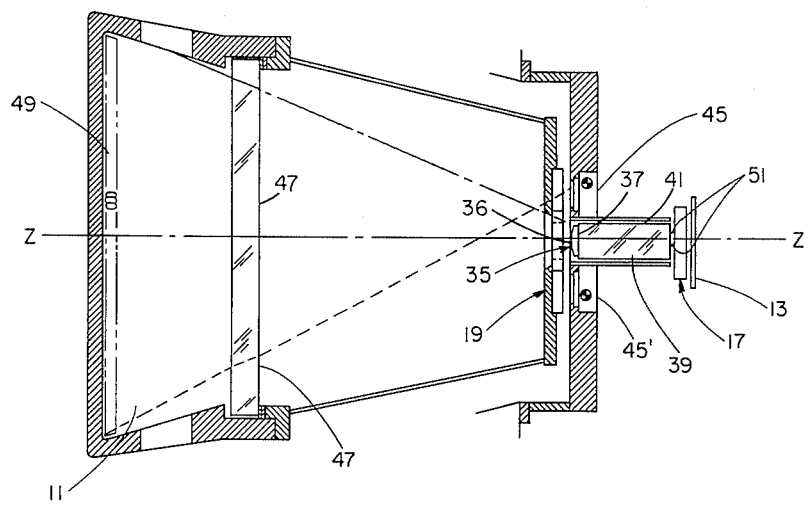

United States Patent Office 3,226,539
Patented Dec. 28, 1965

3,226,539
BUBBLE CHAMBER ILLUMINATION MEANS
Seymour Rosin, Massapequa Park, and Robert B. Palmer, Shoreham, N.Y., assignors to the United States of America as represented by the United States Atomic Energy Commission
Filed July 31, 1963, Ser. No. 299,130
5 Claims. (Cl. 240—41.3)

This invention relates to illumination means for a bubble chamber. The invention described herein was made in the course of, or under, a contract with the U.S. Atomic Energy Commission.

Bubble chambers for detecting nuclear reaction products, comprise a light source, a liquid hydrogen container, a lens system and cameras all arranged so that the light radiated from the light source passes through the hydrogen in the container and returns to the source effectively in a dark field system except when a high energy particle passes through the liquid. These particles are introduced from a source, such as a high energy accelerator, and a momentary reduction in pressure in the hydrogen is created to produce bubbles along the particle trajectories. After a short interval during which the bubbles grow to a size approximately equal to the diffraction limit of the photographic lenses recording the event, the chamber is flash illuminated and the pictures recorded on film.

Various proposals have been made and used to provide sufficient illumination, and while these arrangements have been useful and have accomplished the desired illumination, they have generally used a spherical mirror for reflecting the light from the source and a spherical light condensing system having axially symmetric optical components forming a magnified image of the source in an optical train which is coherent. These systems have been bulky and have not been able to produce sufficient illumination flux for ultra large bubble chambers having a size of eighty inches or more. It has been universally recognized, therefore, that a compact, high flux light source has been desirable for illuminating ultra-large bubble chambers.

In accordance with this invention, there is provided a compact, high flux illuminating means for illuminating an eighty inch bubble chamber used in connection with the Brookhaven National Laboratory thirty-three billion electron volt alternating gradient synchrotron. The system of this invention utilizes standard and well known techniques and apparatus and is highly flexible for a wide range of applications, light intensities and light requirements. More specifically, this invention involves the use of a cylindrical source and condensing system and the elements of this system are arranged, in one embodiment, with thin, elongated, tubular xenon flash tubes having a cylindrical reflector for providing a single high flux extended source image, an extended cylindrical condenser for said image, and a spherical power lens which allows light to be collected along the length of the condenser and to pass through a restricted port area for uniform bubble chamber illumination. With the proper selection of elements, as hereinafter to be more particularly described it is possible to obtain easy source area increase through duplication and the desired high light flux for uniform bubble chamber illumination which is many times that possible with the heretofore known systems. Another feature of this invention, comprises plano reflectors that optically extend the tubular lamp and condenser lengths.

It is an object of this invention, therefore, to provide a novel high light flux means;

It is another object of this invention to provide a single, compact high flux light source utilizing an extended light source;

It is another object of this invention to provide a compact, elongated cylindrical light source which affords easy source area increase through duplication illumination for a bubble chamber;

It is another object of this invention to provide an extended, cylindrical light source, and condenser system for uniformly illuminating a bubble chamber;

It is a further object of this invention to provide an illumination system utilizing an extended cylindrical light source, cylindrical condenser system, and spherical power therefor;

It, is also an object of this invention to extend optically the lengths of a cylindrical, extended light source and condenser for illuminating a bubble chamber;

Various other objects and advantages will appear from the following description of one embodiment of this invention, and the novel features will be particularly pointed out hereinafter in connection with the appended claims.

In the drawings where like parts are numbered alike:

FIG. 12 is a partial horizontal section plane of the apparatus of this invention corresponding to the schematic illustration of FIG. 1;

FIG. 13 is a partial vertical section plane of the apparatus of this invention corresponding to the schematic illustration of FIG. 2;

It is known that in a retrodirective dark field illumination system the illumination diverges from a port in the bubble chamber and proceeds through the port to the rear of the chamber. A retrodirective reflecting means is placed at the rear of the chamber and the rays are sent back upon themselves for re-entry into the port and emergence therefrom. Four cameras simultaneously photograph the chamber at each flash of the illumination means and to this end the cameras may be situated in a square array (e.g., 63.5 cm. on a side) symetrically disposed about the window and facing the bubble chamber. If the rays on their return paths are undeviated they cannot enter the cameras. However, if they strike something such as a bubble they can be diverted into the cameras and be recorded. Thus the tracks show up as bright streaks on a black background. For a further description of bubble chambers, reference is made to the "International Conference on High Energy Accelerators and Instruments," 1959; and the "Proceedings of International Conference on Instrumentation for High Energy Physics," 1960.

It is obvious from the above that the amount of light used in recording the tracks is extremely small as compared with that emerging from the port and great quantities of light flux must emerge from the port in order to obtain sufficient film exposure.

Figure 1:
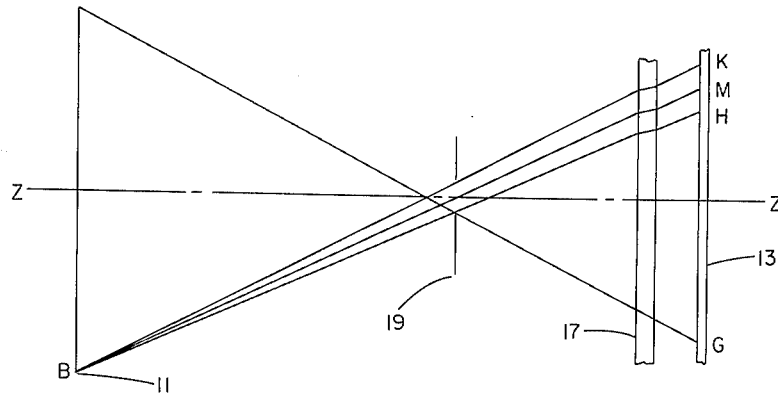
FIG. 1 is a schematic horizontal representation of the cylindrical illumination system of this invention along the continuation of a bubble chamber axis Z—Z.
Figure 2:
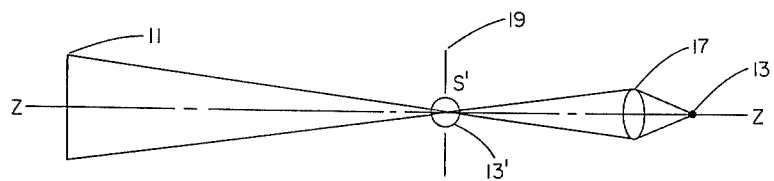
FIG. 2 is a schematic vertical representation along the axis Z—Z of FIG. 1.

In order to explain how the cylindrical system of this invention accomplishes the function of utilizing xenon flash tubes and condensing the light therefrom to provide the required uniform high light flux, reference is made to FIGURES 1 and 2 wherein is illustrated an axis Z—Z representing an extension of the axis of a bubble chamber 11. In FIGURE 2, which represents a vertical cross-section through Z—Z, a thin, cylindrical, extended, xenon flash tube source 13 delivers a beam of high numerical aperture to the cylindrical extended condenser 17. The image of source 13 is formed on port 19 and is shown magnified into 13', from which the beam spreads out vertically to illuminate the bubble chamber 11. The magnification chosen is such as to deliver the finally required vertical beam spread. However, in FIGURE 1, which represents a horizontal cross-section through Z—Z, the lens 17 has no power, and an image of source 13 is not formed at port 19.

In this schematic representation, the source length required to illuminate the full chamber width is GK, and rays delivered to point B of the chamber 11 may arise anywhere between H and K. A similar length of tube will serve to illuminate any other point of the chamber 11.

In explaining the effect of adding spherical power to the system at the port 19, reference is made first to the vertical cross-section (FIGURE 2) in which it is to be noted that no effect will occur in the vertical meridian. However, in the horizontal (FIGURE 1), the effect of spherical power at port 19 will be to alter the interval HK about the point M. If the power be gradually increased from zero, the points K and H will approach M, becoming coincident when the points M and B are conjugate. For this condition the required length of source will be minimum. For still greater power, point H will move to the outside of M, and the required length will again increase.

It is to be noted that the condenser system 17 in no instance forms a coherent image of the source. Even in the case where M and B are conjugate, any point corresponding to B receives rays from all points of the source at M transverse to the source length, so that irregularities in the source in this direction are smoothed out. However, if the source should have irregularities along its length, the conjugate position will show bars of illumination variation in the chamber 11. In the system of this invention, as will be understood in more detail hereinafter, spherical power has been added to the system at port 19 substantially greater than that required for the conjugate condition, and is used for other purposes. For this reason, local irregularities in the source do not show up in the chamber 11.

It will be understood that the cylindrical system of this invention affords favorable geometric circumstances for source increase through duplication. Thus the cylindrical system of this invention affords freedom from the limitation of the spherical mirrors and condensing systems known heretofore where there has been no prospect of increasing source area through the provision of additional sources because of the mechanical interference of the sources with each other.

Figure 3:
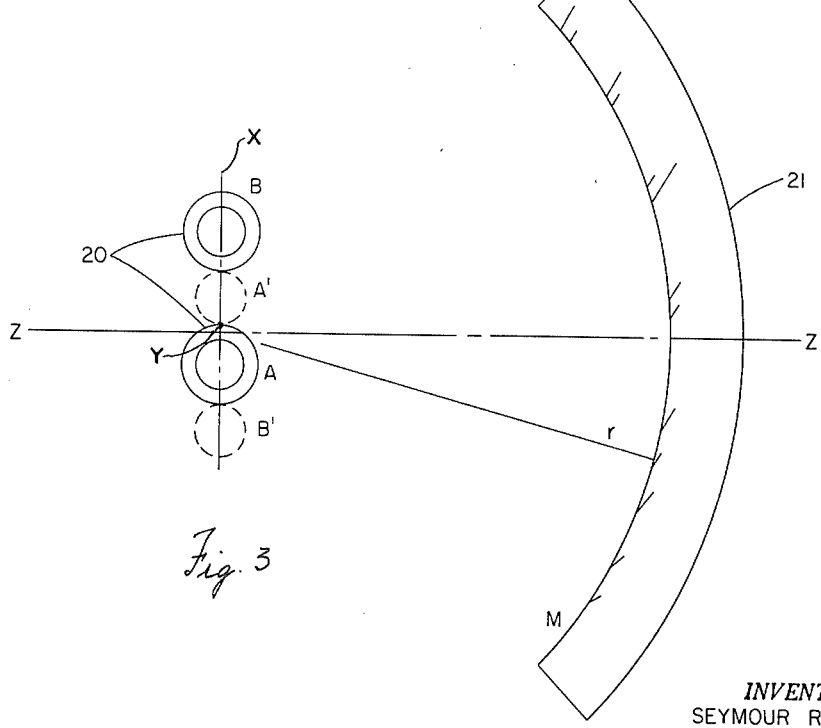
FIG. 3 is a partial cross-section of the light source of FIG. 1.

Referring now to FIGURE 3, in a practical arrangement the xenon flash tube source 11 of this invention comprises two xenon flash tubes 20 and an extended circular cylindrical reflector 21. The circular cylindrical reflector at M is so situated that tube A has its center 2.5 mm. below the mirror axis and tube B 7.5 mm. above the axis Y. Under these circumstances the effective inner 4 mm. of tube A is imaged by M at A' which is mutually tangent to both tubes as shown, and the effective inner 4 mm. of tube B is imaged at B' tangent to tube A. The result is a single, compact source image alongside the reflector 21 which is physically 19 mm. high, of which 16 mm. is effective. Thus, a high flux is achieved by source duplication. The radius of M is relatively unimportant, except that it be large compared to 19 mm. to minimize aberrations. The central axis Y of M should be in the plane X of the tubes. The dimension of M in the plane of the figure should be somewhat larger than that needed to cover the source numerical aperture required (e.g., .75) and it should be roughly as long as the tubes.

Figure 4:
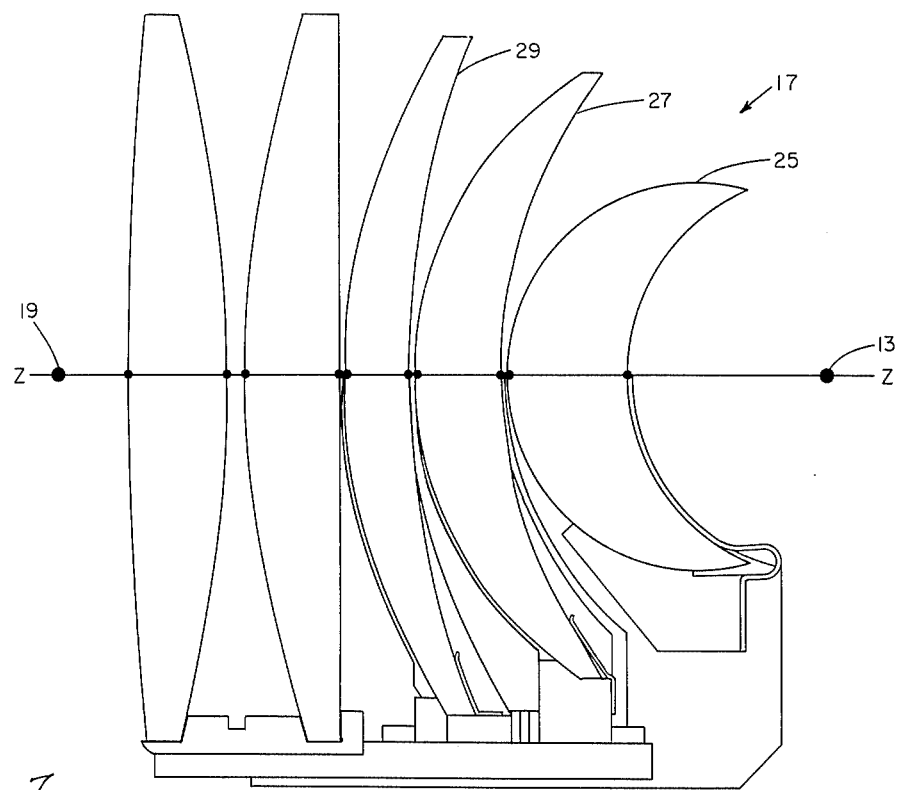
FIG. 4 is a partial cross-section of the cylindrical condenser of FIG. 1.

Referring now to FIGURE 4, in a practical arrangement for the extended cylindrical condenser system 17 of this invention for source 11, a wedge of rays, e.g., whose numerical aperture is .75, is collected by the condenser 17 and transmitted to the port 19 of N.A.=.167, with, therefore, a magnification of 4.5×. Since the beam spread is described in terms of numerical aperture, provision is made for correction of spherical aberration and to this end a high degree of agreement with the sine condition is also provided.

The first three lenses 25, 27 and 29 of cylindrical condenser 17 are aplanatic, that is, the entering surfaces are normal to the axial bundle while the exit surface is aplanatic. The lens nearest the source 13 is made of fused quartz because of the heat. Each of the lenses reduces the numerical aperture by a factor equal to its index of refraction, until it is small enough to be turned into a convergent bundle with the required .167 N.A. The radius of the innermost surface is 39 mm., while the next surface actually extends more than 180°. Correction for chromatic aberration is unimportant in view of the relatively small scale.

Figure 5:
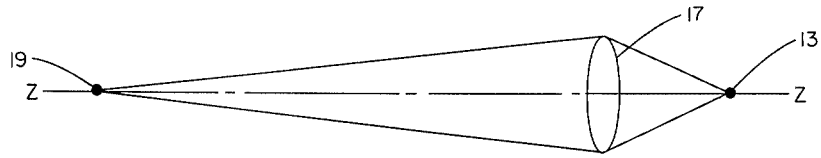
FIG. 5 is a magnified partial schematic view of the elements of FIG. 2.
Figure 6:
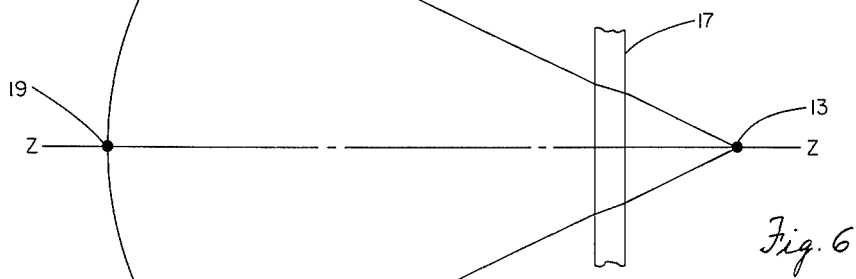
FIG. 6 is a horizontal representation of FIG. 5.

At this point the configuration of the convergent light bundle transmitted by cylindrical condenser 17 is considered. In a vertical meridian a point object is imaged at port 19 as shown in FIGURE 5. Ordinary Gaussian calculations are sufficient to determine the position and the magnification of a small object at the source. However, in actuality a point source is not imaged as a point but as a line. If this line were straight and normal to the axis Z—Z at the port 19 with constant N.A., no difficulty would result, but as shown in FIGURE 6 this line is strongly curved concavely to the lenses of condenser 17. This curvature is accompanied by a severe reduction in magnification and corresponding increase in numerical aperture (N.A.) at its outer portions which would lead to an intolerable reduction in illumination at the horizontal ends of the chamber 11 if left uncorrected. In accordance with this invention, the addition of spherical power at port 19 serves to correct this defect or aberration so that the final overall illumination in chamber 11 is remarkably uniform.

This aberration, for which no counterpart is known to exist, is described herein as producing a curved image line (FIG. 6) which is discerned on a screen placed not quite parallel to the cylindrical axis and a pin cushion effect when the screen is placed normal to the cylindrical axis. This pin cushion has the shape of a spindle with smallest vertical section at the center, corresponding to the vertical N.A.=.167 as desired, much larger sections at the ends, corresponding to a greater N.A. associated with the outer parts of the curved line, and reduced end illumination.

Figure 7:
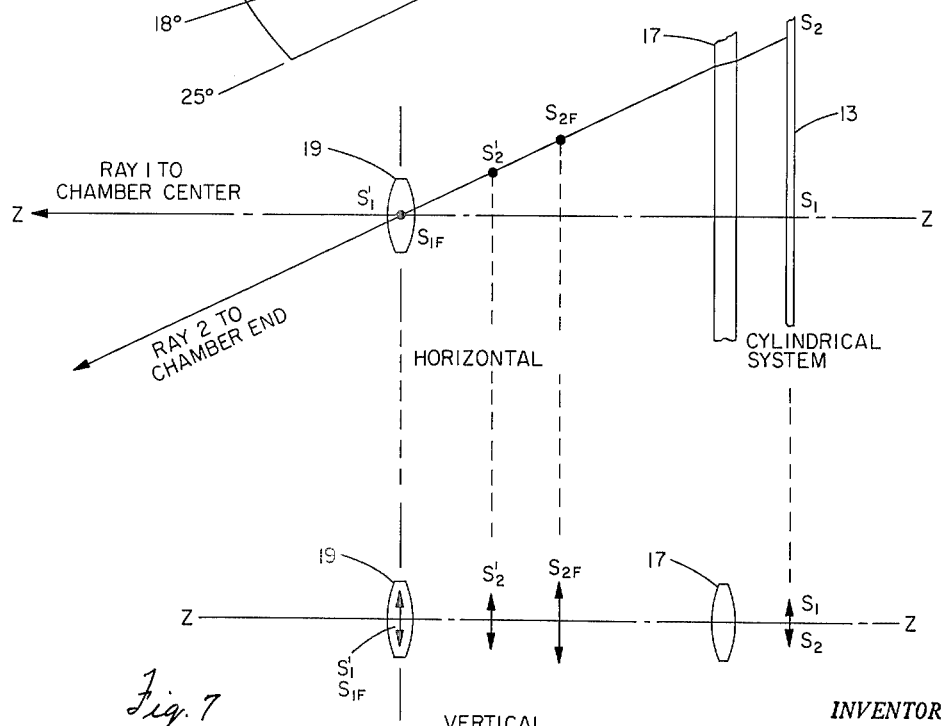
FIG. 7 is a partial schematic representation of the correction effect of lens power at the port of FIG. 1.

The correction of this aberration by spherical power at port 19 in accordance with this invention is illustrated schematically in FIG. 7, which shows the xenon source 13, the cylindrical condenser system 17 and the port 19. The chief ray to the center of the chamber 11 originates at $S_1$ and passes through $S_1'$ at the port 19. The chief ray to the end of the chamber 11 originates at $S_2$. Other rays from $S_2$ normal to the plane cross the plane of the paper at $S_2'$ because of the curved line aberration described above. A small element of the source at $S_1$ normal to the paper is imaged at designed magnification at $S_1'$ while a small element at $S_2$ is imaged at a much lower magnification at $S_2'$. Now if spherical power is added at the port 19, no effect is produced on the position of $S_1$, and $S_{1F}$, its image in the lens is shown coincident with it. However, the off axis image $S_2'$ occurs before the port 19, and the effect of the spherical power at the port 19 is to displace it still further away to $S_{2F}$. However, at the same time it will be magnified, reducing the numerical aperture and restoring the illumination at the ends of chamber 11.

Figure 8:
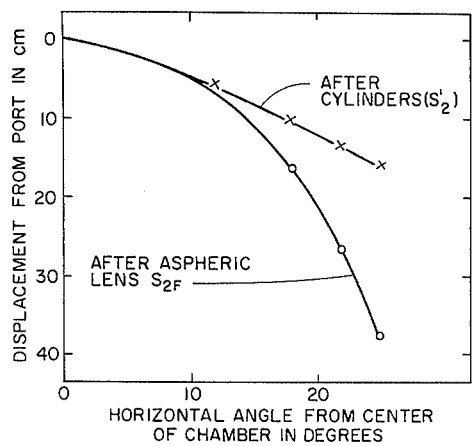
FIG. 8 is a graphic illustration of image measured along ray with the apparatus of FIG. 7.
Figure 9:
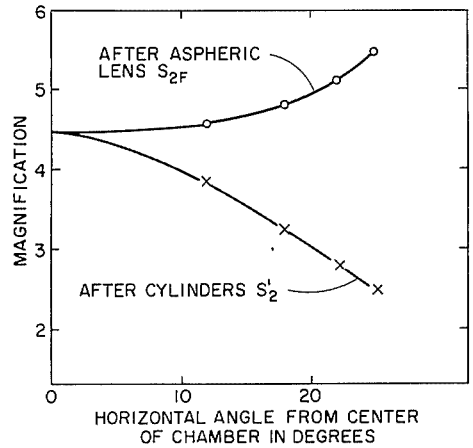
FIG. 9 is a graphic illustration of magnification of image with the apparatus of FIG. 7.

The results are shown in FIGURES 8 and 9. FIGURE 8 shows the positions of the images above referred to, the upper curve referring to the image position $S_2'$ after the cylindrical system 17, and the lower curve to that after passing through the spherical power introduced at the port by lens 35, designated as an aspheric lens 35 for reasons to be apparent hereinafter. FIGURE 9 gives the same data for the magnification. The results show an actual increase in source magnification with field angle, but since the source image is physically further away from the chamber 11 as given in FIGURE 8, the illumination is no greater. But neither is it less, except for a normal $\cos^3 \theta$ fall off.

Figure 10:
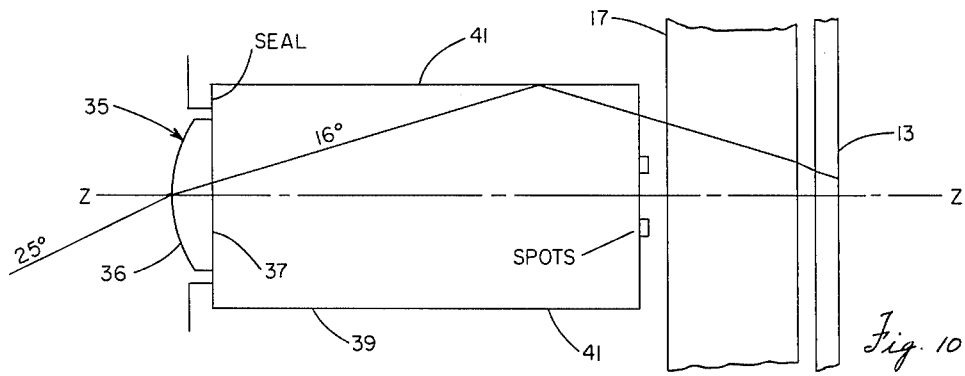
FIG. 10 is a partial magnified view of the elements of the horizontal section of FIG. 7.
Figure 11:
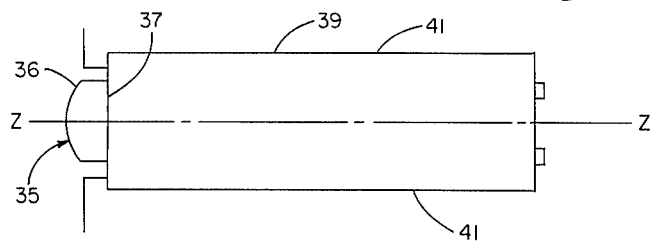
FIG. 11 is a partial magnified view of the elements of the vertical section of FIG. 7.

Referring now to FIGURES 10 and 11, port lens 35 provides the described spherical power with a single aspheric surface 36 in front, a plano rear surface 37 and a large rectangular glass block 39 cemented to the rear plano surface 37. In this way the number of air glass surfaces is reduced. Another advantage of this arrangement arises from the fact that the plano sides 41 of the block 39 can be optically polished, and use made of the internal reflection at these sides for the high angular rays shown in FIGURE 10, thus reducing substantially the required length of the cylindrical lenses of condenser 17 and the xenon tubes 20.

Referring now to FIGS. 12 and 13, which illustrate an overall embodiment of this invention, bubble chamber 11 has a retrodirective dark field illumination means for flash illumination of bubble chamber 11. This chamber 11 has an optical window 47 of plane glass and a compact, internal means located opposite the window for providing photographically acceptable imaging of bubble tracks at a plurality of camera locations 43, 43', 45 and 45' which are symmetrically disposed in a plane parallel to the window with the imaging resulting from illumination of the bubble tracks only by the light incident thereon from the internal means and no imaging of the bubble tracks resulting from other illumination. This illumination means, comprises an extended flash tube light source 13 having cylindrical geometry with the axis of said light source aligned parallel to window 47, a cylindrical reflector 21 for the light source with its concave face towards the window 47 arranged to provide imaging of the light source alongside the light source to increase the effective area thereof, a cylindrical condenser lens system 17 located parallel to the axis Z—Z of the light source and the chamber 11 and opposite the concave face of the reflector 21, and an aspheric lens 35 having a single aspheric surface 36 in front and a plano rear surface 37 located with the plano rear surface facing towards the lens system and light source and parallel to the Z—Z axis. A glass block 39 having internal reflecting surfaces 41, a plane front surface and a parallel plane rear surface is attached to lens 35 with the plane front surface cemented to the plano rear surface of said lens 35. Also provided, in a one-to-one relationship for each of the cameras, is a wafer 51 of highly absorbing dark glass with an index of refraction equal to the index of refraction of the glass block 39 cemented to the plane rear surface of the glass block with cement having an index of refraction equal the index of refraction of the glass block and the wafer. Each wafer 51 has the exposed surface thereof made opaque to prevent light from the source 13 from passing through the wafer, and each wafer is positioned in the image plane conjugate to the plane of the camera apertures formed by the reflecting surfaces of window 47 at a point corresponding to the image point of one of these apertures.

Figure 14:
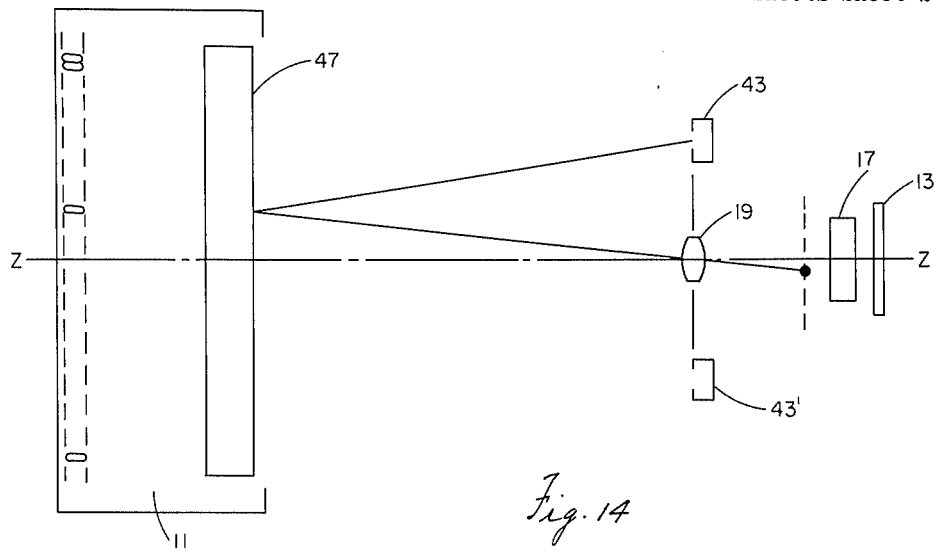
FIG. 14 is a partial schematic view of elements of FIG. 12.

In operation high energy particles are introduced into chamber 11 and the hydrogen pressure in the chamber 11 is momentarily reduced whereby the particles produce bubbles in the hydrogen. When these bubbles grow sufficiently in size to be recorded by cameras 43, 43', 45 and 45' the flash tube source 13 is flashed to illuminate chamber 11 uniformly with a high light flux. To this end flash tubes 20 are flashed, and the light therefrom with the portion thereof reflected from semi-cylindrical, extended reflector 21 enters cylindrical condenser 17 in a single extended wedge of light with high light flux from all along light tubes 20 and reflectors 21. This single wedge or image of light is collected and magnified by cylindrical condenser 17 and transferred in a single convergent bundle to port lens 35. This lens 35 transfers this single bundle of light through port 19 uniformly into chamber 11 with spherical power that corrects the pincushion effect produced by the cylindrical condenser 17. The light then appears through chamber 11 and window 47 to retro-directive reflector 49, which returns the rays of this light upon themselves. Thus the light reflected from reflector 49 passes back through chamber 11 and window 47 with a dark field effect except that where they strike the mentioned bubbles they are diverted into cameras 43, 43', 45 and 45' for recording. Advantageously, the small opaque wafers or spots are placed on the plano surface of block 39 closest to source 13 to block light from the source which can be reflected from either or both of the surfaces of window 47 in bubble chamber 11 when window 55 is perpendicular to the axis Z—Z of chamber 11. This reflection is illustrated in FIG. 14. Another solution to this problem, however, is to set window 55 at an angle to this axis but since this has obvious geometrical disadvantages, the spots 43 and 45 are preferred.

In the described actual embodiment of this invention for the BNL 80 inch bubble chamber, the following parameters were used for the cylindrical lens system 17:

*Table I*

| E.F.L. | 70.00 | Lens Purpose Condensing. |
|---|---|---|
| Image Distance | 39.00 | Lens Type Cylindrical. |
| N.A. | .750 | Object Distance (−379.5). |
| Stop Height | 140 | Object Size, 85.6. |
| Magnification | .2193 | Instrument, 80 inch bubble chamber. |
| Image Size | 19 | Dimensions in mm. |

| Radius of Curvature | Separation | Height | $N_F$ | Material |
|---|---|---|---|---|
| 734.7 | | | | |
| | 20.0 | 140 | 1.57952 | LBC2 |
| −258.4 | | | | |
| | 3.0 | | | |
| 205.3 | | | | |
| | 20.0 | 140 | 1.57952 | LBC2 |
| ∞ | | | | |
| | 1.0 | | | |
| 115.14 | | | | |
| | 13.0 | 130 | 1.57952 | LBC2 |
| 175.03 | | | | |
| | 1.0 | | | |
| 67.467 | | | | |
| | 17.0 | 116 | 1.57952 | LBC2 |
| 93.180 | | | | |
| | 1.0 | | | |
| 37.423 | | | | |
| | 24.0 | 74.846 | 1.46318 | Quartz |
| 39.000 | | | | |
| Length of Cylinders | 406.4 | | | |

Other important optical and mechanical data for this embodiment is as follows:

*Table II*

Optical Distance—From Field Lens to Inside
 of Window, cm. _____ 190.5
Window Free Aperture, Inside, cm. _____ 193 × 63.5
Angles from Field Lens _____ 25° × 9°38'
Numerical Aperture _____ .42 × .167
Numerical Aperture at Source _____ .75
Magnification Condenser System _____ 4.56×

*Table II*—Continued

| | |
|---|---|
| Source Height, cm. | 1.9 |
| Image of Source Height, cm. | 8.6 |
| Image of Source Length, cm. (arbitrary) | 18 |
| Effective Image of Source Area, cm² | 146 |
| Field Lens Free Aperture, cm. (corners rounded) | 19.7 x 10.8 |
| Field Lens to Retrodirector, cm. (air) | 257 |
| Camera Lens to Field Lens (reflected by surface ½ way between 2 window surfaces), cm. | 380 |
| Sagittal Field Curvature Displacement (at height 3.12 cm.), cm. | .175 |
| Equation of Aspheric Surface (approximate) $x = 2.804 \times 10^{-2} y^2 + 1.043 \times 10^{-5} y^4$ (cm.) | |
| Sagitta at Corner of Aspheric ($y = 11.2$ cm.), cm. | 3.10 |
| Length of Glass Block (BK7), cm. | 56.8 |
| Magnification of Camera Apertures at Spot Plate | .0982× |
| Size Retrodirector, cm. | 234 x 83.8 |

It is thus seen that there has been provided a novel system for providing high light fluxes utilizing long cylindrical light sources. This invention also has the advantage of providing a long cylindrical light source with a cylindrical condenser and spherical power so as to provide the desired high flux, and a compact, single source area illumination means for ultra large bubble chambers.

What is claimed is:

1. Illuminating apparatus for use with a bubble chamber, comprising extended lamps having central axes spaced in a plane, and a single cylindrical reflector for said lamps having a central, extended, mirror axis between said axes in said plane and a concave face towards the chamber that reflects the light from said lamps into a single source image with a high, effective light flux by source duplication for illuminating said chamber.

2. The invention of claim 1 in which said lamps are thin first and second xenon flash tubes having 4 mm. inside diameters and said cylindrical reflector is situated with the first tube center axis 2.5 mm. below said mirror axis and the second tube center axis 7.5 mm. above said mirror axis, the effective inner 4 mm. of the first tube being imaged by the reflector in a first image between the first and second tubes and mutually tangent to both tubes in said plane and the effective inner 4 mm. of the second tube being imaged in a second image tangent to the first tube in said plane so that said first and second tubes and images form together a single, 16 mm. high, compact, light source in said plane.

3. Illuminating apparatus for use with a chamber, comprising means consisting of two extended tubular lights having central axes spaced apart in a plane and a cylindrical reflector having a central, extended, mirror axis between said central axes in the plane thereof for producing a single extended source image, a cylindrical lens system means for receiving and condensing light from said image, and transmitting said light in a convergent bundle, and means providing spherical power to said light transmitted by said cylindrical lens system for uniformly transmitting large amounts of luminous flux into said chamber from the single extended source image.

4. Illuminating apparatus for use with a bubble chamber, comprising means consisting of two extended tubular lights having central axes spaced apart in a plane and a cylindrical reflector having a mirror axis between said axes in the plane thereof for producing a single extended source image, a cylindrical lens system means for receiving and condensing light from said image and transmitting said light in a convergent spindle shaped bundle, and spherical power means for said light transmitted by said cylindrical lens system for uniformly transmitting large amounts of luminous flux into said chamber from said source image, said spherical power means having a single aspheric surface at one end facing said bubble chamber, a plano surface at the other end thereof, and a large glass block attached to said plano surface.

5. The invention of claim 4 in which said glass block is formed with polished sides capable of internal reflection for high angular rays entering said block from said single source image optically to increase the length of said lights and said cylindrical lens system therefor.

References Cited by the Examiner

UNITED STATES PATENTS

| | | | |
|---|---|---|---|
| 1,977,120 | 10/1934 | Dirkes et al. | 88–24 |
| 3,132,810 | 5/1964 | Ostensen | 240—1 |
| 3,141,149 | 7/1964 | Lawton | 240—41.25 |
| 3,143,921 | 8/1964 | Russell | 240—41.3 |

OTHER REFERENCES

The Journal of Photographic Science, vol. 10, 1962, "Bubble Chamber Photography," pages 243—251.

NORTON ANSHER, *Primary Examiner.*

CHARLES C. LOGAN, *Assistant Examiner.*